March 30, 1937. C. SAUZEDDE 2,075,062
SELECTIVE CONTROL AND COMPENSATOR UNIT FOR HYDRAULIC BRAKES
Filed May 19, 1932 2 Sheets-Sheet 1
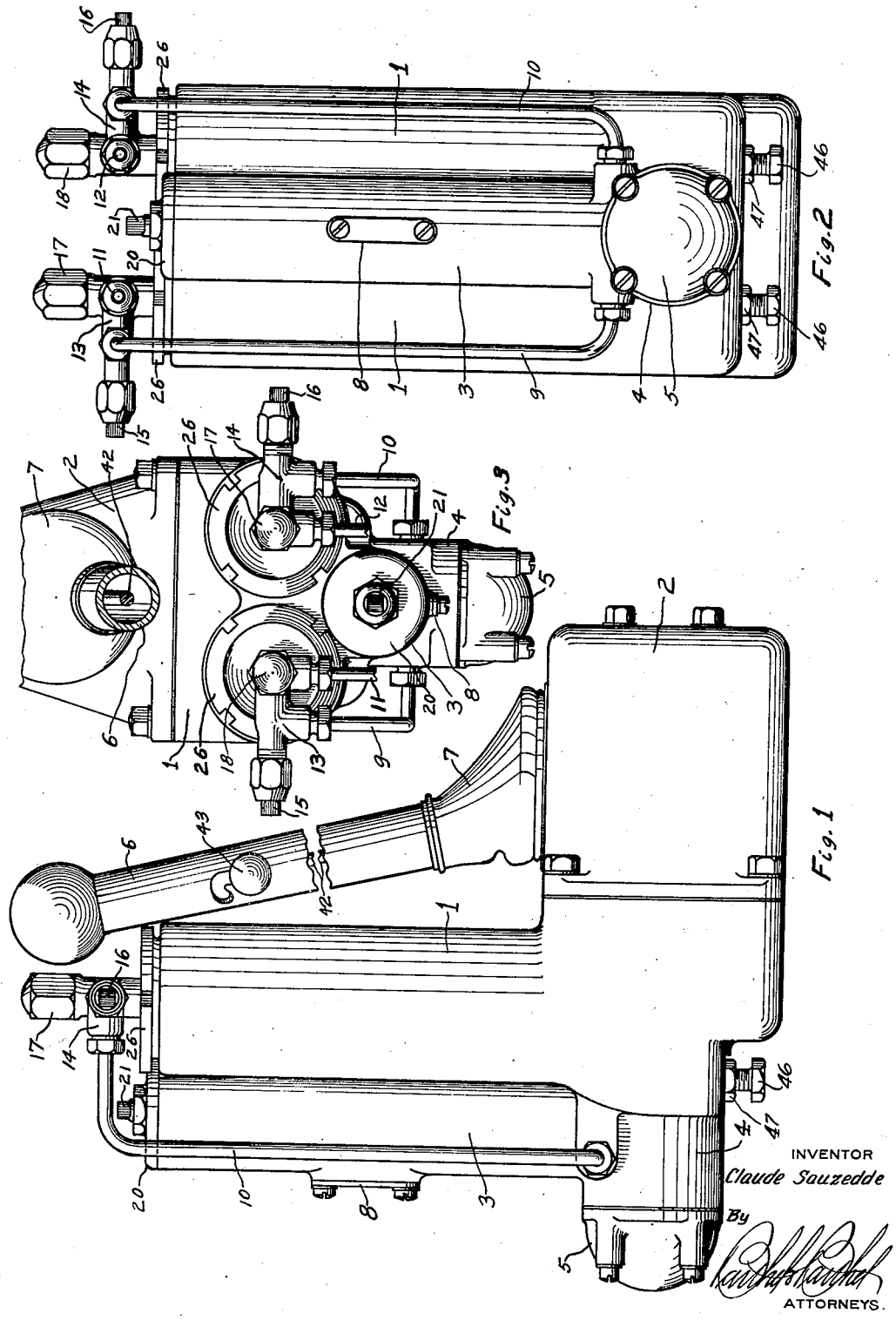
INVENTOR
Claude Sauzedde
ATTORNEYS.

March 30, 1937.     C. SAUZEDDE     2,075,062
SELECTIVE CONTROL AND COMPENSATOR UNIT FOR HYDRAULIC BRAKES
Filed May 19, 1932     2 Sheets-Sheet 2
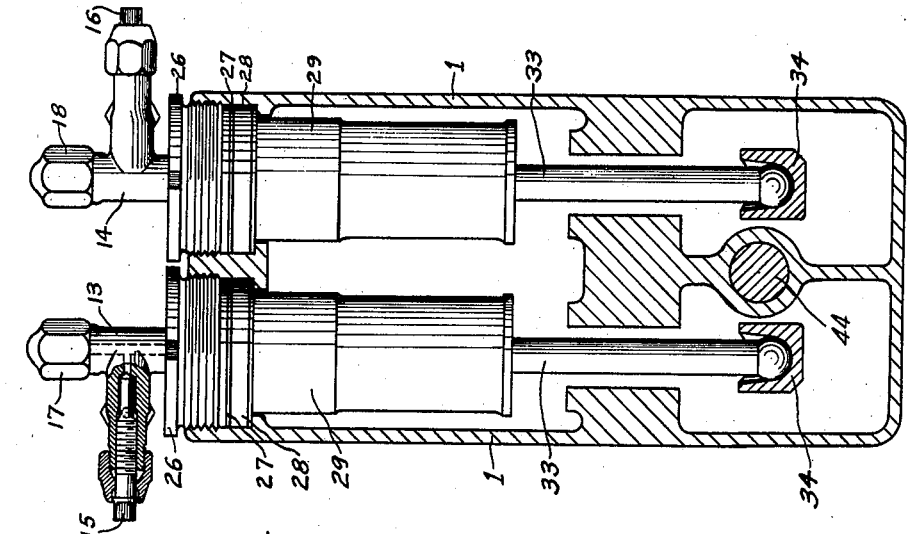
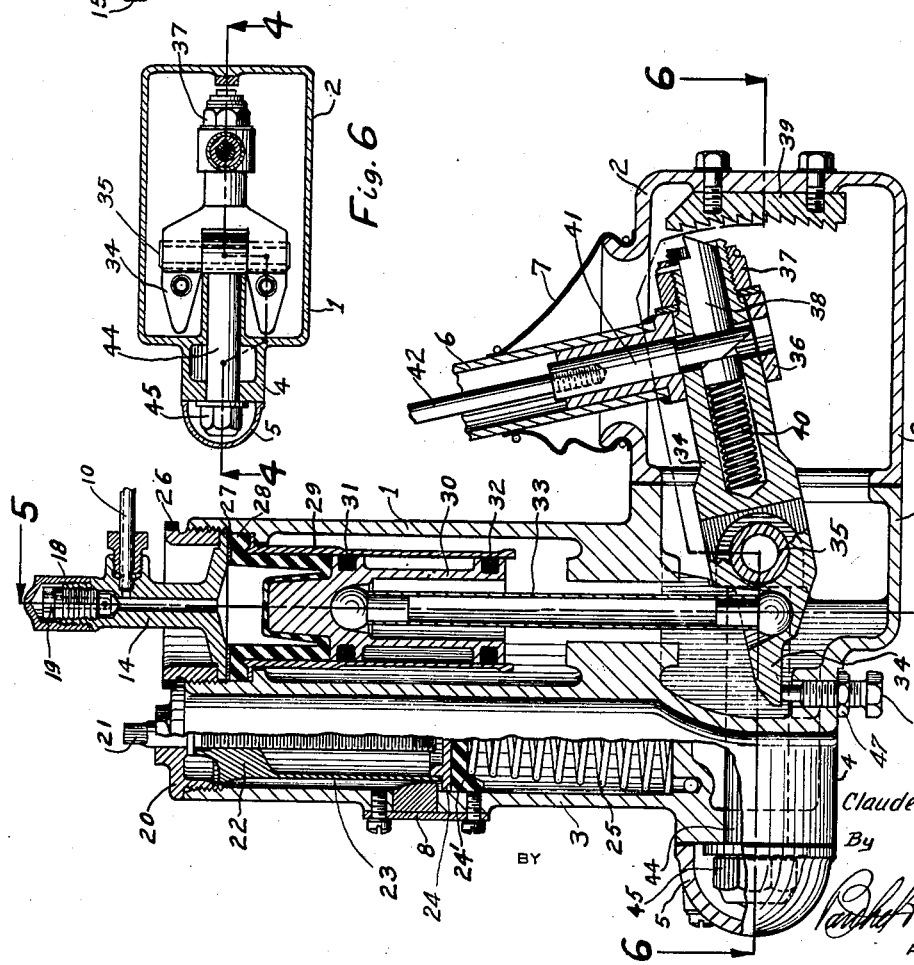
INVENTOR
Claude Sauzedde
BY
ATTORNEYS.

Patented Mar. 30, 1937

2,075,062

UNITED STATES PATENT OFFICE 2,075,062

SELECTIVE CONTROL AND COMPENSATOR UNIT FOR HYDRAULIC BRAKES

Claude Sauzedde, Detroit, Mich., assignor to Detroit Hydrostatic Brake Corporation, Detroit, Mich., a corporation of Michigan Application May 19, 1932, Serial No. 612,175

11 Claims. (Cl. 188—16)

The present invention relates to a unitary structure embodying two manually-operated compressors and a compensator for fluid pressure braking-wheel systems especially adapted for aircraft application for positively and selectively controlling the braking of each wheel independently and for applying equal pressure to the brake-shoe actuating mechanism of both wheels simultaneously.

An object of the invention is to provide an especially compact device requiring a minimum of space for satisfactory installation and operation, the actuating mechanism being lockable in any desired operative position.

Of the accompanying drawings,

Figure 1 is a side elevation;

Fig. 2 is a front end elevation;

Fig. 3 a top view;

Fig. 4 a fore and aft vertical sectional view;

Fig. 5 a combined elevation and vertical section along line 5—5 of Fig. 4, and

Fig. 6 a horizontal sectional view along line 6—6 of Fig. 4, which shows compressor piston in position of maximum retraction corresponding to the "off" position of wheel braking mechanism to which the compressors are piped.

The same parts on all drawings are indicated by like reference numerals, the signification of which is given as follows:

1—unitary housing integrally embodying one compensator cylinder 3 and embracing two separated independently removable compressor-cylinders 29 connected to the compensator cylinder 3 by externally-disposed piping 9—10 equipped with suitable shut off valves 15—16 for controlling the flow of braking fluid.

2—detachable housing extension protectively enclosing compressor-piston actuating mechanism at lower end of hand control lever 6.

3—integrally-formed compensator cylinder from which braking fluid is forced to compressor cylinders 29 and through pipes 11 and 12 to wheel-braking mechanism to compensate for any loss due to leakage of fluid and for volumetric changes due to wear of contacting surfaces of brake shoes and brake drums.

4—integral housing element serving to support a horizontally-disposed oscillable shaft 44 carrying at its rearward end a tubular pivot pin 35 on which bifurcated compressor-piston actuating lever 34 is oscillable in a direction at right angles to the plane of oscillation of pivot pin axis.

5—housing cap member giving access, when removed, to nut 45 preventing endwise movement of horizontally-disposed oscillable shaft 44 by which forked end of compressor-piston actuating lever 45 is supported in pivotal relation thereto.

6—hand-lever control member having endwise and crosswise oscillable movement for actuating, either simultaneously or independently, pistons 30 to compress fluid in wheel-braking mechanism.

7—flexible "boot" attached to control lever 6 and to housing extension 2, closing opening in latter while accommodating endwise and crosswise movement of control lever 6, thus preventing entrance of "foreign" matter that would foul and cause undue wear of parts of compressor-piston actuating mechanism.

8—guiding member having an inwardly-extending "key" element projecting into a slot 23 milled lengthwise in wall of compensator piston 22, locking the latter against rotative movement when the threaded compensator-piston actuating shaft is turned by hand wheel or wrench applied to shaft end 21.

9—10—pipe lines serving to connect outlet openings at base of compensator cylinder to valved fittings 13—14 at top of and in communication with compressor cylinders, into which, when valve stems 15—16 are manipulated to open fitting valves, fluid under pressure is forced by inward movement of compensator piston.

11—12—pipe lines leading to braking-mechanism cylinders containing pistons serving to move brake-shoes into engagement with contacting surfaces of brake drums of wheels.

13—14—dual-purpose fittings containing shut-off valves controlling flow of fluid from compensator cylinder to both compressor cylinders simultaneously, or to each of them independently, each fitting containing also a bleeder valve 19 through which, when open, entrapped air is discharged from wheel-braking mechanism and piping leading thereto.

15—16—squared-end stems of shut-off valves in dual purpose fittings 14—15 furnishing means of controlling communication between compensator and compressor cylinders and braking mechanism in vehicle wheels.

17—18—caps covering bleeder valves 19 through which, when open, entrapped air collecting in the upper ends of the compressor cylinders, the highest point in the braking system, is discharged as compressor pistons are moved upwardly.

20—axially-pierced flanged and threaded thrust-resisting closure gap of compensator cylinder through which projects the threaded compensator-piston actuating rod or shaft having an outer squared end 21 to which an internally squared hub of hand-wheel or wrench is applied when shaft is to be turned to actuate piston 22, the cap having an upstanding hexagonal boss to receive the wrench by which it is screwed into place.

22—compensator piston of trunk-type having at its upper end an axially-disposed threaded opening for a threaded actuating shaft which, when turned in clockwise direction, forces piston downward, thereby causing braking fluid to flow into compressor cylinders when shut-off valves in fittings 13—14 are open, the reactive thrust being resisted by the compensator cylinder cap 20, against the underside of which the shoulder of actuating shaft bears.

23—lengthwise slot cut in piston 22 to receive inwardly-directed combined guiding and locking projection of "key" member 8, which prevents rotation of piston when threaded actuating shaft is turned.

24—compensator-piston head having an upturned concentric annular projection or lip fitted into the circular opening at lower end of hollow piston 22.

24'—flexible resilient sealing member held against compensator piston head 24 by coiled compression spring 25 seated on bottom of compensator cylinder, the force exerted by the spring serving to keep shoulder of actuating shaft in contact with cylinder cap 20 at times when anticlockwise turning of actuating shaft relieves pressure on the fluid in the compensator cylinder.

26—screw-threaded clamping rings seating on the upper machined faces of base flanges of fittings 13 and 14, slots cut in the peripheral edge of outwardly extending flange at top of each ring permitting application of spanner wrench for screwing ring into position for rigidly clamping upper-end flanges of cylinders 29 against integral shoulders of housing 1.

27—circular axially pierced washers interposed between underside of bases of fittings 13—14 and flanges of resilient stretchable piston-head seals 28 seated on outwardly projecting annular flanges of upper ends of compressor cylinders 29 and serving to distribute clamping force applied to rings 26 over whole area of piston-head sealing-member flanges.

28—doubly-cupped stretchable piston-head sealing members supported by and at all times contacting walls of compressor cylinders 21 and heads of pistons 30 and having outwardly extending annular flanges tightly clamped by rings 26 between washers under bases of fittings 13—14 and the annular outwardly-extending compressor-cylinder flanges abutting against inwardly-extending machined shoulders forming an integral part of housing unit.

29—removable relatively thin-walled steel compressor cylinders machined all over to secure light weight with great tensile strength, the cylinder wall opposite skirt of piston being made lighter than the portion contacted by the piston-head sealing member subjected to maximum braking fluid pressure.

30—undercut open-end or trunk-type compressor piston having a head adapted to project into the inwardly-directed cup of stretchable head-sealing member 28 and having an upper annular head groove for packing 31 and a similar lower skirt groove for packing 32.

33—light hollow ball-ended connecting or piston-actuating rod fitting into hemispherical sockets in compressor piston head and toe of actuating lever 34, which is supported for fore and aft oscillation on hollow transversely oscillable pivot pin 35 supported by oscillable shaft 44.

34—bifurcated lever member pivotally supported by pivot pin 35 and shaft 44 for endwise and crosswise oscillation by hand-operated control lever 6, rearward movement thereof in plane of axis of compensator cylinder forcing compressor pistons inward to "set" brakes of both right and left wheels simultaneously, while crosswise movement affords means for "selecting" either right or left wheel for braking action and resulting movement of aircraft to which braking wheels are attached.

35—tubular pivot pin supported for transverse or crosswise oscillation by shaft 44 and providing for fore and aft oscillation of hand lever control 6, provision for lateral or crosswise movement of which is made by mounting pivot pin 35 in end of oscillable shaft 44.

36—hand-control-lever lower-end plug pierced by tapered opening into which rearward tapered end of rocking bifurcated lever member 34 is drawn tightly by axially-pierced lockable nut 37 through which projects rearwardly the latching plunger element 38 that, when in engagement with the notched segmental member behind it, locks the bifurcated lever member 34, and mechanism it actuates, in any position corresponding with the fluid pressure developed in the compressor cylinders.

38—normally retracted plunger-type latch movable at will into locking engagement with notched segmental member 39 by tension of compression spring 40 when lower wedge-ended member 41 is withdrawn by upward movement of rod 42 within hand control lever 6, in which is cut a bayonet-type locking slot for holding locking plunger 41 out of its plunger-retracting position in plunger opening in which it moves, the upper end of rod 42 being provided with a ball 43 to facilitate hand manipulation of rod to release or retract latch 38.

39—renewable notched segmental member detachably held to rear wall extension 2 of unit housing 1 which resists thrust exerted by plunger latch 38 when brake-actuating compressor pistons are "locked" in any desired position.

40—coiled compression spring serving to force plunger latch 38 into locking engagement with notched segmental member 39 when plunger-retracting element 41 is withdrawn from latch opening wherein it slides when rod 42 is actuated to withdraw or to release latch 38.

41—latch-actuating member coaxially disposed within hand control lever 6 and attached to lower end of similarly-disposed rod 42 by which it is drawn up to permit spring 40 to project latch into engagement with notched segment 39 and forced down to effect retraction of latch 38 when brakes are to be released by reducing pressure on braking fluid.

42—43—rod and ball-ended connection thereto for reciprocating the actuating element 41 by which the latch 38 is withdrawn from or permitted to make locking engagement with notched segmental locking member 39.

44—oscillable shaft located below and midway between the compressor cylinders and supported by housing unit at right angles to axes of compensator and compressor cylinders, as shown by Figs. 4, 5, and 6, and carrying, at its rearward end a transversely-disposed tubular pivot pin 35 providing for fore and aft oscillation of hand control lever 6, lateral or crosswise oscillation of which is provided for by shaft 44.

45—nut preventing endwise movement of oscillable shaft 44 providing for crosswise movement of hand control lever 6 and covered by cap 5 of forward shaft-bearing housing extension 4.

46—47—stop screw and lock nut adjusting means for limiting movement of compressor pistons, the maximum retraction of which is indicated by Fig. 4, which shows a toe of actuating lever member 34 resting on the ends of stop screw 46, simultaneous upward movement of both pistons accompanying rearward manipulation of hand control lever 6, differentiation in the pressure produced on fluid in the compressors being effected by crosswise oscillation when lever is being moved rearwardly.

The body of casing 1, to which a rearwardly-projecting extension 2 is detachably applied, integrally embodies the compensator cylinder 3 and a forwardly-projecting extension 4 sealably closed by a detachable cap 5. Operative control of compressor-piston movement is effected manually through the hand lever 6, to which, near its base, is applied a flexible sealing boot 7 for excluding foreign matter from the rearwardly-projecting extension 2.

A key member 8 projecting inwardly through an opening in the wall of the compensator cylinder body 3, to which the key member is detachably held in the manner indicated, serves to prevent turning of the compensator piston 22 when it is forced inwardly by turning the threaded actuating shaft 21, the outer end of which is squared to receive the correspondingly squared hub of a hand-wheel or socket wrench by which the shaft is turned to force into the braking system enough fluid to compensate for any loss due to leakage.

As indicated by Figs. 1, 2 and 3, two pipe lines 9 and 10, connected to the compensator cylinder 3 at its base, deliver to the two compressor cylinders 29 the fluid subsequently discharged therefrom through pipe lines 11 and 12 connected to fittings 13 and 14, wherein are control valves having stems whose outer ends 15 and 16 are squared to receive the correspondingly squared hub of a hand wheel of socket wrench by which the valves are actuated. Under the caps 17 and 18 are bleeder valves 19 through which entrained air is discharged at the highest point in the braking system, the combined compensator-compressor unit being located above the braking wheels, to one or both of which fluid under pressure is supplied in accord with fore and aft or crosswise manipulation of hand lever 6.

The upper end of the compensator cylinder 3 is closed by an axially pierced circular cap 20 having an upstanding hexagonal boss for screwing it into place. The outer end 21 of the threaded shaft by which the coaxially-disposed compensator piston 22 is driven inwardly is squared to receive the correspondingly squared hub of a hand wheel or wrench by which the shaft is turned to force fluid from the compensator cylinder 3 into both compressor cylinders 29 when valves having similarly squared stems 15 and 16 are open. After actuation of compensator piston forces into compressor cylinders an amount of fluid sufficient to compensate for leakage or for any volumetric change due to wear of contacting surfaces, valves 15 and 16 are closed.

And when it is desired to remove from the braking system entrapped air collecting at the top of compressor cylinders, caps 17 and 18 are removed and bleeder valves 19 are opened, so that when compressor pistons are forced inward the entrapped air is forced out, whereupon bleeder valves 19 are closed and valves 15 and 16 opened so that more fluid may be forced from the compensator cylinder into the compressor cylinders to compensate for the volume of air discharged and thus restore normal working conditions.

It is obvious that, since the wheel brakes are not applied when the compensator piston is actuated, the braking-fluid pressure is not high enough to necessitate using a piston-head sealing member such as that applied to each compressor piston head and cylinder, the simpler resilient sealing member 24' being adequate to prevent leakage, but with the high pressure developed when wheel brakes are applied it is essential that adequately supported stretchable doubly-cupped piston-head seals having reinforced flanges shall be clamped between cylinder-head members (bases of fitings 13 and 14) and the flanged ends of cylinders, as clearly shown in Fig. 1.

It is equally obvious that, although it would be possible to make use of integrally formed ducts in housing as means of communication between compensator and compressor cylinders, without departing from the spirit and scope of my invention, it is more convenient and less troublesome to use externally applied piping, valved fittings, and suitable connections for that purpose, parts accidentally damaged being readily replaceable. As a matter of fact the unit as a whole represents a compact assembly of renewable parts supported by and mostly within a housing comprising separable parts 1, 2, and 5 affording protection to the enclosed mechanism, which is so mounted as to provide maximum stress relief under operative manipulation through use of "universal-joint" type connections for compressor piston rods and hand lever control member 34.

Moreover, maximum movement of parts is relatively small, wear thus being reduced to a minimum, provision being made for subjecting to pressure by compressor pistons, for taking up clearance between shoes and drums of wheels when brakes are "set", only a small volume of fluid, a much smaller volume, in fact, than is required in operating types of hydraulic wheel-braking systems other than that for which this combined compensator-compressor unit was developed especially for aircraft application, the braking pressure differential made possible thereby being utilizable for steering purposes when "ships" are grounded.

*Operation*

Since the invention is designed particularly for service in connection with air-planes, the operation is presented in connection with such service, it being understood that the plane is equipped with suitable landing wheels in which the braking mechanism—brake shoes and complemental braking surfaces—are located and have connection with pipes 11 and 12, the latter being individual to the several wheels.

The invention is designed more particularly to selectively control the operations of the respective brake mechanisms so as to permit more or less flexibility of movement of the plane when on the ground.

For instance, during flight, the brake mechanism is unneeded, and it is to be asumed that the parts will be in the position of Fig. 4, with the possible exception that latch 38 may be engaged with segment 39 to maintain the mechanism in position; this is assumed to be the position also when the plane is landing, excepting that latch 38 will possibly be withdrawn, since locking of the landing wheels would be undesirable during this period. However, it may be possible that with the plane moving at slow speed on the ground, it may be desirable to turn in a particular direction, in which case the selective control may be operative to produce the result. When the plane comes to rest, it is desirable to lock it by applying the brakes and setting the mechanism in its locked position; in such case, both brakes are equally applied. If it is desired to taxi the plane from one position to another, the brake mechanisms are released and the selective manipulation provided to permit movement in the proper directions, and when the new position is reached, the brake mechanisms are again set. It will be understood, of course, that during the manipulative movements latch 38 will be released from engagement with the segmental rack 39, since manipulation in various directions may be required, the latch and rack being designed for service as a latching structure when the mechanisms are to be locked against movement, at which time both mechanisms are in similar status provided by the fore and aft movement of lever 6.

As will be understood, the parts are in inactive positions when toes 34 are resting on screws 46, at which time the pressure within the two lines 11 and 12 is at its minimum, determined, as usual, by the spring pressure set up within the brake mechanisms and which serves to move the brake shoes to inactive position when the fluid pressure is released. Hence, if lever 6 is then moved rearwardly to rock lever member 34 on pivot pin 35—without any turning movement of shaft 34 on its axis—both pistons will be raised concurrently, to move the fluid from the compressors and begin activity of the two brake mechanisms by first taking up the lost motion effect normally present between the brake shoes and braking surfaces, and then making the pressure active to provide the brake shoe pressure and develop the braking friction. When the latter has brought the plane to a stop, raising of knob 43 to the opposite position in Fig. 1 raises rod 41 out of contact with the latch member 39, permitting spring 40 to move the latch 38 into contact with one of the teeth of rack 39, to retain the lever 6 in such position and locking the brake mechanisms.

When it is desired to release the brake mechanisms, as when taking off, knob 43 is released and moved to the position of Fig. 1, the lower pointed end of 41 entering the opening in member 38 during the movement, and withdrawing the latch member from its engagement with the rack. When this is done, lever 6 may be moved forwardly, manually, although the spring action of the brake mechanisms will produce a similar result; if the lever is moved to its full extent, the return movement will place the parts in the position of Fig. 4. As will be understood, the latter part of this return movement will be taken up by developing the usual lost motion relation between the brake shoes and braking surfaces.

In addition to the braking action referred to, the invention provides for additional adjustments such as to set up differential action as between the respective brake mechanisms, thus permitting the plane to be readily turned by setting up variations between the effective brake pressures of the mechanisms. For instance, if the lever 6 be shifted laterally—but without movement in the fore and aft direction—a movement of member 34 will be provided by the rotative movement of shaft 44 on its axis. Since toes 34 are on opposite sides of the axis of shaft 44, such movement of member 34 will serve to raise one of the toes and lower the other, with the result that pressure in the direction of brake application will be provided by the toe being raised, while lowering movement of the piston of the other compressor line will be permited by the toe being lowered. Hence, such movements will set up different brake pressures in the two mechanisms with the result that the resistance to turning movement of the landing wheels will not be equal, the wheel with less resistance being capable of freer advance than the other wheel; the value of the differential pressures will depend upon the extent of lateral movement of lever 6.

As will be understood, such lateral shift of lever 6 is prevented when member 34 is in either extreme of its oscillation on pin 35, due to the fact that pin 35 and shaft 44 have a fixed relation to each other, with shaft 44 held from movement longitudinally by its mounting, and the shaft in turn having an eye within which pin 35 is mounted so that the pin can move bodily only about the axis of shaft 44. Hence, with the parts in the position of Fig. 4, oscillation of member 34 about the axis of shaft 44, in the absence of a concurrent rearward movement of the lever, would be resisted by one of the screws 46 or 47, since the fixed position of the shaft 44 would prevent its being raised, if the attempt were made to change the leverage conditions by making such pin the fulcrum. In the other extreme position—the brakes being fully set—a similar condition would be present, although the proposed movement on one side would be in the direction of release of pressure. The difficulty comes from the fact that with the brakes fully set, the oscillation of member 34 about the axis of shaft 44 would require an increase of pressure on one of the mechanisms, and since that pressure is at its maximum, it serves as the fulcrum and the inability of shaft 44 to yield prevents such change in leverage conditions.

However, it will be understood that because of the fixed relation between shaft 44 and pin 35, the leverage relationship remains unchanged, and both toes 34 move concurrently relative to the axis of shaft 44 when the lever is moved. However, it is apparent that if the lever 6 be moved rearwardly a small increment of distance from the position of Fig. 4, both toes will be raised correspondingly; if then, the lever is moved laterally until the lower toe contacts its screw by the oscillation of member 34 about its axis, the effect would be approximately similar to that of having retained one of the pistons against movement while the other was being raised, the small initial movement making no material change in the position of such piston, so that the latter was maintained, for practical purposes, against movement. The effect is due to the fact that the axis of the pistons is spaced from the axis of pin 35, so that while the intersection of the axes of pin 35 and shaft 34 remain constant in position, the remoteness of the piston axes and the screws 46 and 47 from the axes of shaft and pin, permits this development.

From this it can be understood that if the lever be moved to the new position diagonally, or approximately so, the combined movements referred to in detail above as successive, can take place concurrently, with the result that, if the movement be accurate, it would be possible to maintain the lower toe in contact with its screw during the movement, the raising (both toes) and lowering (one toe) compensating one another. Hence, in either extreme, it is possible to limit the piston movement to that of one of the pistons, so that, within these positions, the pistons can be considered as movable individually. However, in practice, this careful manipulation is unnecessary, since, with the brakes fully set, the operator would ordinarily reduce the pressure before turning, thus initially lowering both pistons before beginning the lateral movement of the lever 6, thus permitting the latter movement to again increase the pressure on the inner wheel mechanism; and, in the lower extreme, the lost motion relation between brake shoes and braking surfaces permits the initial fore and aft movement of the lever before beginning the lateral movement, so that, in practice, the accurate diagonal movement of the lever is unnecessary. However, as indicated, such movement is possible, and where conditions require, can be employed. For instance, if the lost motion is small and it is desired to set up the differential in pressure without brake application, the diagonal movement of the lever from the position of Fig. 4 will permit the operator to prepare his assembly without brake application, and then complete the desired operation in turning of the plane; the same condition would be present if it was desired to set up this differential relation with the brakes fully set when it is desired to retain the fully set relation of one of the wheels; in such case the rearward diagonal movement of the latter will permit this to be done.

It is obvious, of course, that during plane turning activities—during which period manipulation of the lever must be under constant control—the latch 38 is held released from the teeth of rack 39. Such contact is desired only when the lever is to be retained in definite position for an extended period, and in such cases the brakes of both wheels are generally fully set. For this reason the rack is shown co-operative with the latch member only during fore and aft lever movements; during rotative movements of member 34 the latch is held in its released position.

As will be seen the axes of the shaft 44 and pin 35 intersect within an end zone of the shaft and intermediate the ends of the pin, the shaft remaining constant in position at all times, but capable of rotation on its axis, so that the shaft axis can be considered as also constant in position. During fore and aft movements of lever 6 the pin axis remains constant relative to the shaft axis so far as concerns a plane extending through the casing and on which the shaft axis is found, the member 34 moving angularly through such plane during the fore and aft movements of the lever. However, during rotative movement of the member by lateral movement of the plane, the axis of the pin is oscillable about the point of intersection of the shaft and pin axes to vary the relationship of the end zones of the pin axis relative to such plane.

It will be understood, of course, that the movement of lever 6 rearwardly in the fore and aft direction necessarily moves both pistons concurrently through the action of member 34 and the rods 33; during the forward movement of the lever in this direction, however, the movement of member 34 permits the rods 33 to drop, the pistons aiding in this movement through the action of the spring structure of the brake mechanism forcing the actuating fluid from the brake mechanism structure and returning it to the compressors. Obviously, during the lateral movement of the lever 6, these two types of action are combined, due to the fact that the movement of the pin axis, in oscillating about the point of intersection of the shaft and pin axes, affects the position of opposite sides of member 34 and thus of the toes of such member, since one of the toes will be raised while the other is depressed. Hence, but one of the rods is being moved by the member, the latter simply permitting the other rod to move in the opposite direction—this condition, in effect, is present during the diagonal movement of the lever, although the latter direction also includes the rearward travel of the lever. Hence, the rods may be said to be moved concurrently in the same direction during the pivotal movement of member 34 on pin 34, but moved individually by the member during oscillation of the latter about the shaft axis.

What I claim is:—

1. For fluid-pressure wheel-braking systems, a unitary selective-control structure comprising a housing integrally embodying a fluid-supplying compensator cylinder and housing-wall annular supports for two removable open-ended compressor cylinders; piping and valved-fitting connections affording means of communication between said compensator and compressor cylinders; sealed-head pistons reciprocable in said cylinders; means for actuating piston in said compensator cylinder to force braking fluid therefrom into said compressor cylinders when valves in said valved fittings are open and to discharge entrapped air from compressor cylinders when bleeder valves in said valved fittings are open; mechanism within and protected by said housing, for moving pistons in said compressor cylinders so as to put braking fluid therein under pressure; said mechanism comprising an externally-disposed manually-operated control member attached at its base to a bifurcated lever member protectively enclosed by a detachable extension of said housing and so mounted as to permit of crosswise and fore-and-aft oscillatory movement of said control member, with ball-ended piston rods resting in hemispherically-shaped sockets in the toe ends of said bifurcated lever member and in underside of said pistons, rearward movement of said manually-operated control member serving, through connected mechanism, to force said compressor pistons inwardly and compressing braking fluid in both compressor cylinders equally and simultaneously and also, at will, to establish in said compressor cylinders and in wheel-braking mechanism connected thereto by piping, unequal pressures and correspondingly unequal braking effects whereby aircraft moving on ground may be swerved to right or lift, as desired, and means for locking said control member and mechanism attached thereto in any desired operative position.

2. An aircraft selective wheel-braking control unit comprising a housing integrally embodying a fluid-supplying compensator cylinder and embracing a pair of removable open-ended compressor cylinders supported by inwardly-projecting annular housing-body walls; a sealed-head piston movable inwardly in said compensator cylinder by manually actuated screw-threaded shaft passing through axially-disposed threaded opening in upper-end wall of said piston, which has a vertical groove to receive and slide upon a stationary removable key preventing rotation of piston when threaded shaft that moves it is turned; a compression spring within said compensator cylinder in clockwise direction for returning piston when its threaded actuating shaft is turned in anti-clockwise direction; detachable piping and valved-fitting connections affording means of communication between said compensator and compressor cylinders and wheel braking mechanism thereto connected; said fittings embracing valves for shutting off communication between compensator and compressor cylinders and bleeder valves for draining off entrapped air collecting in compressor cylinders, the bases of said valved fittings resting on washers contacting outwardly-projecting reinforced circular flanges of compressor piston-head seals; threaded notched-edge clamping rings screwed into housing body and against said fitting bases to hold said flanges of compressor piston-head seals in non-leaking contact with flanged upper ends of removable compressor cylinders; sealed-head trunk-type pistons moved inwardly to compress braking fluid in said removable compressor cylinders by an externally-disposed manually-operated control member having at its base an oscillably-mounted bifurcated lever member with hemispherically shaped sockets at its forward end for ball-ended piston rods housed at opposite ends in similar sockets in underside of compressor pistons, rearward movement of said control member serving to move inwardly the pistons in compressor cylinders and thereby put under pressure the braking fluid therein and in wheel-braking mechanism connected thereto by piping and thus effect braking of wheels, selective crosswise movement of said control member to right or left effecting a corresponding swerving of aircraft moving on ground.

3. An aircraft wheel-braking control unit of selective type comprising a housing integrally embodying a fluid-supplying compensator-cylinder and inwardly projecting annular walls supporting a pair of removable open-ended and flanged-end compressor cylinders wherein inwardly-moving sealed-head trunk-type pistons subject braking fluid to pressure manually-produced through manipulation of a hand-lever control member, said pressure serving to move brake shoes into contact with co-operating brake surfaces, piping and valved fittings outside and connecting said cylinders affording means of controlling communication between them, a sealed-head piston within said compressor cylinder adapted to be moved inwardly by means of a threaded shaft passing through a coaxially-disposed internally threaded opening in the top of said piston, inward movement of which forces braking fluid into both of said compressor cylinders when shut-off valves in fittings closing the upper ends thereof are open, communication between compensator and compressor cylinders being cut off by closing said valves, whereupon inward movement of pistons in said compressor cylinders puts fluid therein under wheel-braking pressure equally distributed to both wheels when hand-lever control member is pulled straight back in a plane embracing axis of compensator cylinder and unequally distributed when hand-lever control member is moved laterally to right or left to cause aircraft moving on ground to swerve in corresponding directions, said hand-lever control member having at its base a bifurcated lever member pivotally attached near one end to a shaft oscillably supported by and within said housing to provide for endwise and crosswise movement of said hand-lever control member.

4. A fluid compressor comprising a pair of open- ended cylinders having ports in their closed ends adapted to be individually connected to separate braking systems, pistons slidably mounted in said cylinders, rods connected to said pistons, and a member engaging both of said rods and mounted in a manner whereby it may pivot to move both rods concurrently in the same direction and oscillate to move the rods individually, the axes of pivotal and oscillatory movements being individual and extending at substantially right angles to each other, means being provided to prevent member movement about the oscillatory axis independently of member movement on the pivotal axis when the member is in its rest position.

5. A fluid compressor comprising a pair of open-ended cylinders having ports in their closed ends adapted to be individually connected to separate braking systems, pistons slidably mounted in said cylinders, rods connected to said pistons, a bifurcated arm engaging both of said rods, and means for supporting said arm in a manner whereby it may pivot to move said rods simultaneously and oscillate to move said rods individually, said arm supporting means including a shaft and pivot pin the axes of which intersect within an end zone of the shaft and intermediate the ends of the pin, the shaft axis being constant in position with the pin axis oscillable about the point of intersection of said axes.

6. A fluid compressor comprising a pair of open-ended cylinders having ports in their closed ends adapted to be individually connected to separate braking systems, pistons slidably mounted in said cylinders, rods connected to said pistons, a bifurcated arm engaging both of said rods, means for supporting said arm in a manner whereby it may pivot to move said rods simultaneously and oscillate to move said rods individually, and releasable locking means adapted to hold said bifurcated arm against movement, said arm supporting means including a shaft and pivot pin the axes of which intersect within an end zone of the shaft and intermediate the ends of the pin, the shaft axis being constant in position with the pin axis oscillable about the point of intersection of said axes.

7. A fluid compressor comprising a pair of open-ended cylinders having ports in their closed ends adapted to be individually connected to separate braking systems, a fluid compensator reservoir formed integral with said cylinders and connected thereto, a piston in said reservoir adapted to force fluid therefrom into said cylinders, pistons slidably mounted in said cylinders, rods connected to said pistons, and a member engaging both of said rods and mounted in a manner whereby it may pivot to move both rods simultaneously in one direction and oscillate to move the rods in opposite directions, the axes of pivotal and oscillatory movements of the member being relatively positioned in a manner such that with the member in its rest position movement of the member on its oscillatory axis independently of movement on the pivotal aixs is prevented.

8. In brake mechanism for aircraft wheels, individual service lines for the hydraulic braking mechanism of the respective wheels, a control unit for the operation of the service lines, said unit including a compressor for each line, a compensator operatively connected to both compressors by connections operable at will, and mechanism movable to render the compressors active on the braking mechanisms collectively or individually, said mechanism being movable pivotally on one axis and oscillably on an independent axis, said axes extending in approximate right angular relationship, said axes of pivotal and oscillatory movements of the member being relatively positioned in such manner that with the member in its rest position movement of the member on its oscillatory axis independently of movement on the pivotal axis is prevented, said compressor operating mechanism including means rendered active and inactive at will for maintaining the position of the mechanism in either of its pivotal positions, the activity of said means being dependent upon substantially equal pressure conditions in the two compressors.

9. Brake mechanism as in claim 8 characterized in that the mechanism means is of ratchet characteristic.

10. In brake mechanism for aircraft wheels, individual service lines for the hydraulic braking mechanism of the respective wheels, a control unit for the operation of the service lines, said unit including a compressor and its piston for each line, a compensator operatively connected to both compressors by connections operable at will, mechanism movable to render the compressor pistons active to apply the brakes collectively or individually, said mechanism being movable pivotally on one axis and oscillably on an independent axis, said axes extending in approximate right-angular relationship, and means in the path of travel of the member to establish a rest position for the member in the inactive zone of braking activity, said axes of pivotal and oscillatory movements of the member being relatively positioned so that with the member in such rest position movement of the member on its oscillatory axis independently of member movement on the pivotal axis is prevented, pivotal movement of the member out of such rest position permitting independent movement of the member on the oscillatory axis.

11. Mechanism as in claim 10 characterized in that the oscillatory axis is located to provide advance of one piston and retraction of the other piston when the member is out of such rest position.

CLAUDE SAUZEDDE.